US007887281B2

(12) United States Patent
Haney

(10) Patent No.: US 7,887,281 B2
(45) Date of Patent: Feb. 15, 2011

(54) TRANSPORT VEHICLE WITH LIFTING DEVICES

(76) Inventor: Marrell Haney, 1301 W. 96th St., Chicago, IL (US) 60643

( * ) Notice: Subject to any disclaimer, the term of this patent is extended or adjusted under 35 U.S.C. 154(b) by 957 days.

(21) Appl. No.: 11/141,289

(22) Filed: May 31, 2005

(65) Prior Publication Data

US 2005/0265813 A1 Dec. 1, 2005

(51) Int. Cl.
*B60P 1/00* (2006.01)

(52) U.S. Cl. .......................... 414/540; 414/921; 296/19

(58) Field of Classification Search ................. 414/540, 414/921; 296/19
See application file for complete search history.

(56) References Cited

U.S. PATENT DOCUMENTS 5,205,700 A * 4/1993 Lin et al. .................... 414/540
5,573,300 A * 11/1996 Simmons ............... 296/193.04
5,651,149 A * 7/1997 Garman ..................... 5/81.1 R
5,702,142 A * 12/1997 Newell ........................ 296/19
6,254,159 B1 * 7/2001 Wieczorek et al. ............ 296/19
6,302,010 B1 * 10/2001 Holler ....................... 89/36.08
6,435,804 B1 * 8/2002 Hutchins .................... 414/540
6,616,396 B2 * 9/2003 Sternberg ................... 414/538
6,798,343 B2 * 9/2004 Carrier et al. .......... 340/539.13
6,857,840 B2 * 2/2005 Simpson et al. ............. 414/491
6,916,056 B2 * 7/2005 Mitchell et al. ............... 296/20
2004/0100063 A1 * 5/2004 Henderson et al. .......... 280/166
2004/0202533 A1 * 10/2004 Haire ......................... 414/538

* cited by examiner

*Primary Examiner*—Michael S Lowe

(57) ABSTRACT

The vehicle is adapted for use in hospitals and nursing homes, and is provide with features and safety mechanisms that are needed as innovated support for medical caregivers. The transport vehicle consisting of a frame part that is generally attached to the chassis with nut, bolts, screws and sealant as part of a constructing process that includes welding and joining an instrument projecting from a main part to a frame plate. Left and right side running boards consist of clamps for inserting into metal brackets attached on both side of the vehicle in a manner that allows for removing the runner boards whenever they are not needed. The invention consisting of a multipurpose plastic folding chair is provided for lifting patients from their in-house bed and placing them into a passenger bed of the transparent passenger compartment for transporting the patient to a treatment location.

3 Claims, 5 Drawing Sheets

TRANSPORT VEHICLE WITH LIFTING DEVICES

RELATED APPLICATION

This is a continuation of Provisional Application Ser. No. 60/571,814 which was filed on May 4, 2004, and is entitled A transport vehicle with lifting devices and the disclosure of which is incorporated by reference.

BACKGROUND OF THE INVENTION

1. Field of the invention

The present invention relates to a battery powered vehicle with lifting devices that are provided for maneuvering and transporting objects and individuals who are in hospitals and nursing homes environments and for numerous other related usages.

2. Description of the Related Art

Traditionally, transport vehicle of this variety are primarily used for things other than health care in hospital and nursing homes. For example, the present invention is adapted to provide health care that include lifting a patient from a bed or a chair and placing the patient into a bed of the transport vehicle for transport to a designated treatment location. The present invention is provided with health care devices that include an intravenous supply stand and running boards that are provided on each side of the transport vehicle for emergency medical caregivers who administer emergency care to a patient while they are in transport to a treatment location. In the mean time, most related Art are provided for moving items and goods. On the other hand, health care in hospitals and nursing homes is the primary goal of the present invention.

BRIEF SUMMARY OF THE PRESENT INVENTION

Some of the embodiments that are included in the present invention are illustrated in an improved medical transport vehicle by way of representation and not limitation of which, incorporates electric motors to propel the vehicle through the use of batteries, drive shafts and axles devices to drive the rear-wheels. A front end section consists of a retractable bed for use in transporting patients who must lay in a horizontal position, in a detachable folding chair that is designed to collapse into a bed form. The collapsed chair is then placed beside a bed ridden patient to allow health care providers to position the patient onto the temporary bed before transporting the patient to a designated treatment location.

Another embodiment of the present invention is to have an instrument projecting from an axis that is located at the rear section of the vehicle. The instrument projecting from a an axis is adapted to fold to a vertical position at the rear end of the vehicle while it is not in use. Some mechanisms including gears, clutches, switches and durable brake devices are provided for different functions of the transport vehicle.

A further embodiment of the present invention is to provide in generally, a horizontal intravenous stand that is attached to the front left side of the vehicle, and also provided are collapse-able running boards that can be attached to each side of the transport vehicle for use during emergency transport of patients. These running boards provide platforms for caregivers who provide medical assistance during movement of patients to treatment locations.

Yet another embodiment of the present invention is to provide a medical transport vehicle that is equipped with a rotary dome light which is attached onto the exterior front end of the transport vehicle. In addition, the transport vehicle is also provided with beepers and lights that are adapted to flash on and off as safety features.

Other embodiments of the present invention are to provide a transport vehicle with a rear end drive, and wheels that are provided with tubeless tires.

A further embodiment of the present invention is to provide a transport vehicle that is adapted for use in hospitals and nursing homes environments.

BRIEF DISCRIPTION OF THR DRAWINGS

FIG. 1 is a perspective view of a transport vehicle with a lifting devices that are adapted for maneuvering patients onto a horizontally folding chair and lifting the patient up into the transport bed section of the transport vehicle for transporting to a treatment location.

Referring to FIG. 2 is a perspective view showing a vehicle chassis with drive shaft devices to propel the vehicle and other movable devices that are adapted for maneuvering and lifting patients and objects.

Referring to FIG. 3 is a perspective of an instrument projecting from a rear axis that is adapted for lifting and maneuvering people and objects.

DETAILED DESCRIPTION OF THE DRAWINGS

Figure 1:
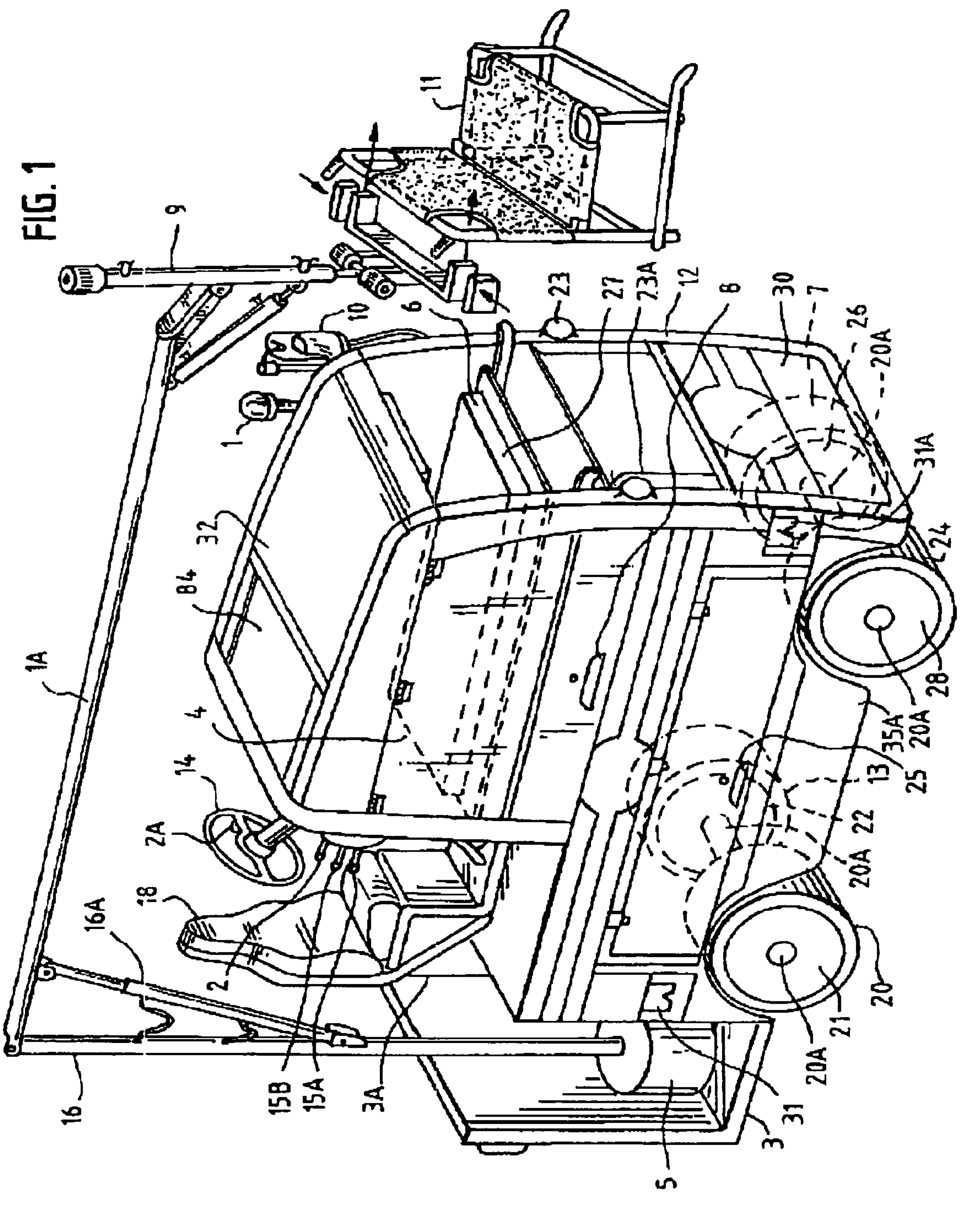

FIG. 1 sets forth is a perspective view of a transport vehicle 12 having a front end 42, a lifting device 16 and is motor driven in accordance with designs of the present invention. Transport vehicle 12 is provided with a first power source 25 which is supported by a plurality of roller wheels 21, 22, 26 and 28. The body is preferably formed with aluminum steel or plastics materials or the like, and in generally, symmetrically throughout transport vehicle 12 which include the top side 32, the left side partially shown, the right side 35*a* and the front side 30. Be it known that the right side of transport vehicle 12 is a mirror image of the left side. Thus, while it is not clearly shown in FIG. 1, it will be understood that transport vehicle 12 further include an identical left side in accordance with the present invention. It will also be understood that the transport vehicle is provided with a retracting vertical arm 16 which is connected to a horizontal front end component of the instrument projecting from the rear vertical axis bar 16. The axis 5 is attached onto metal base 3. An instrument projecting from an axis 16 connects to a horizontal bar 1*a* which extends horizontally to the front retracting bar 9. An instrument projecting from an axis 16 having a support bar 16*a* is adapted for maneuvering bars 1*a* and 9 to manipulate folding chair 11 which collapses into a flat position Folding chair 11 collapses to form a temporary bed mechanism. It is preferably formed of aluminum steel, plastics or the like. Transport vehicle 12 provided with a rotary light 1 which can be activated by a switch and an intravenous stand 10 is provided for emergency use while transporting patients.

Figure 4:
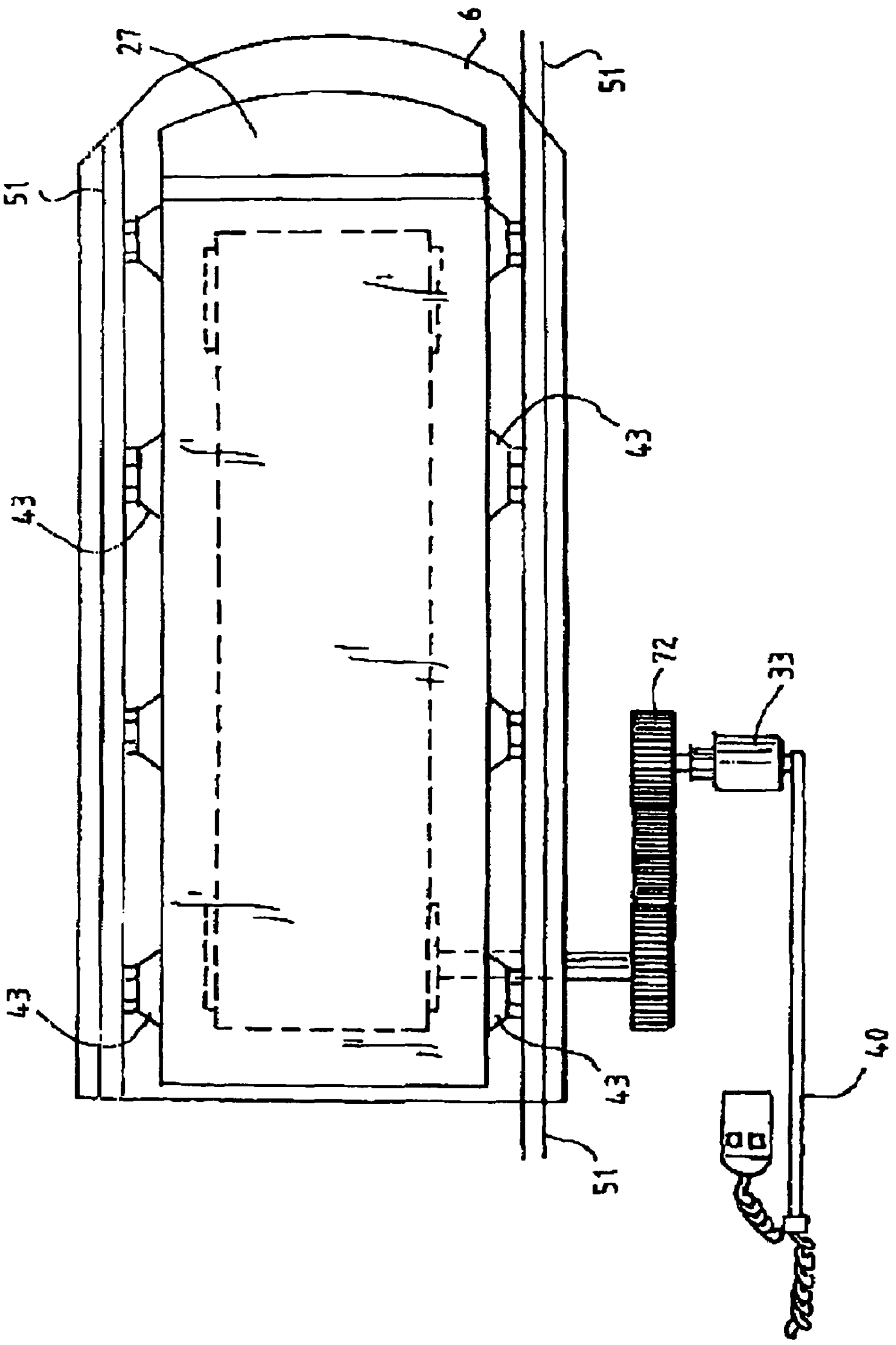
FIG. 4 is a perspective showing a bed that is adapted for rotating on horizontal tracks which are designed for moving the roller equipped bed in and out of the hood section, transparent covered compartment.

Transport vehicle 12 is provided with a first power source 25 and a second power source 8. Electricity provides currents to the batteries as a second power source. The invention is provided with front right side light 23*a* and a front left side light 23 that may be used during emergency transports. Cylinder tracks 51 as shown in FIG. 4, pivot outward from underneath transparent compartment 27. The transport vehicle 12 also consists of a motor driven patient bed 6 that is adapted for rolling on cylinder tracks 51 as shown in FIG. 4 which rotates on a horizontal line in and out of the transport vehicle transparent compartment 27. Also provided is front bumper which connects to frame with metal bolts and the like. A left front wheel 26 and a right front wheel 28 are adapted for front axle 20*a* with washers and lock nuts. All wheels are adapted with tubeless tires 7, 24, 13 and 20. Rear wheels 21 and 22 having attachments to rear axle with washers and lug nuts at 20*a*. Transport vehicle 12 is also provided with a right side 35*a* which is a mirror image of the left side. Aluminum steel or plastics or the like are suitable materials for constructing the transport vehicle. The transport vehicle 12 is provided with on/off switch 2, gear and lever 15*a*, for activating and maneuvering lever 15*b* and light switch 2*a* as component devices for transport vehicle 12. The steering wheel 14 is attached to the front end steering mechanisms with metal fasteners, and the operator seat 18 is supported with a vertical support bar 3*a* which is attached to seat 18 and the frame sections with metal fasteners. Shown are metal brackets for attaching the running boards 31 and 31*a*

Figure 2:
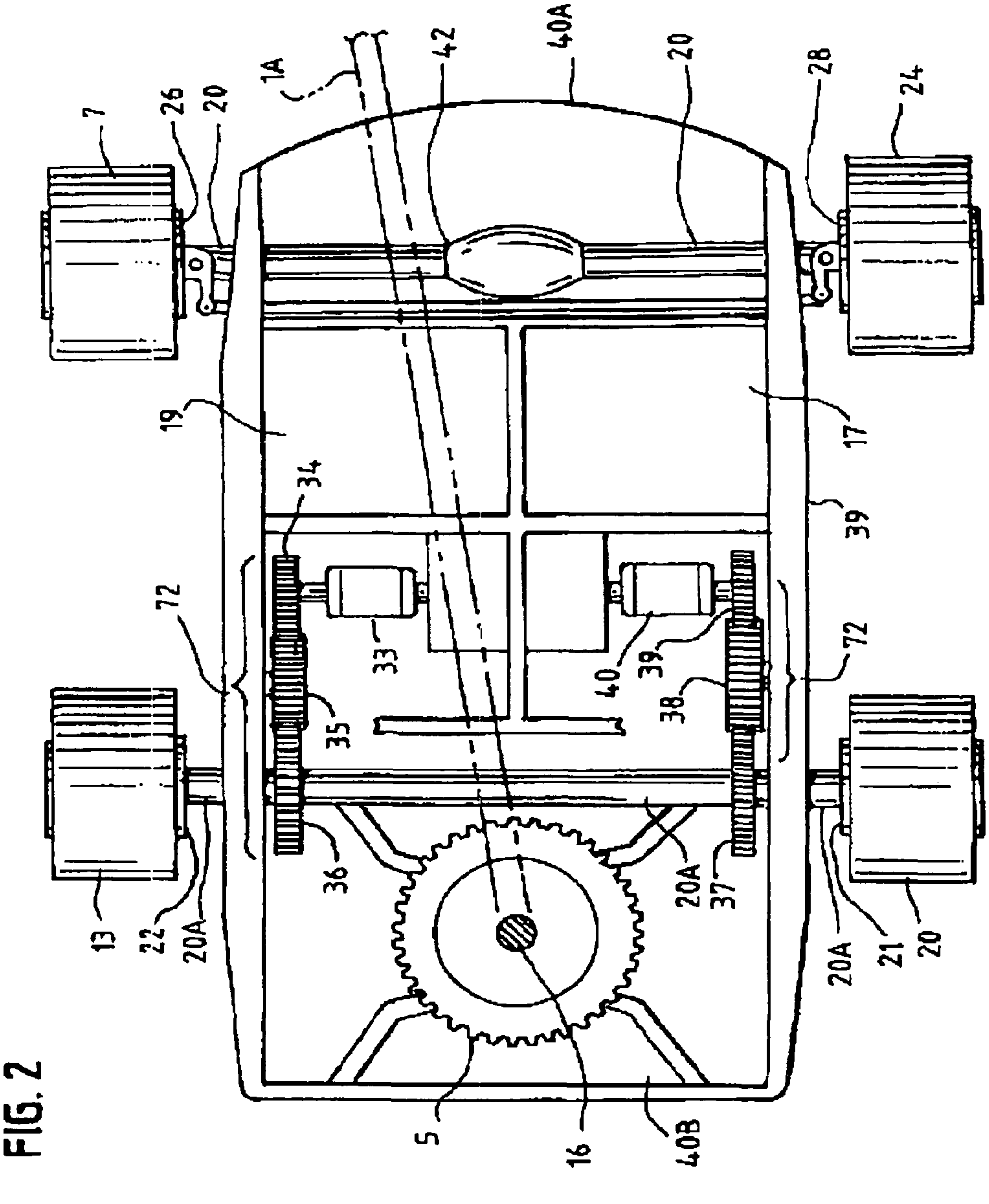

FIG. 2 sets forth is a vehicle chassis 40*a* that is constructed in accordance with the present invention which includes a power train group 40*b* comprising axles 20*a*, transfer devices and a rear axis for manipulating an instrument projecting from a rear axis 16 FIG. 1, and other functional parts. A front end axle 20*a* with steering mechanism, and is provided with wheels 26 28, 21 and 22 that attaches to the front and axles with metal fasteners. Second power source 8 provides current to electric motors 33, 40, and to the left drive shafts 72 which have driving wheels 34, 35 and 36 and the right sides drive shafts 72 with wheels 37, 38 and 39.

A vertical axis 16 with base connection on a rear flat metal base 5 is adapted for manipulating the instrument projecting from a rear axis 16 which is suited for retracting and folding to a vertical position directly behind vehicle 12 operator's seat 18 which is supported by suspension bar 3*a* as seen in FIG. 1. The suspension bar 3*a* pivots vertically from frame section and connects to the bottom side of operator's seat section 18 which is joined to a lower support bar 3*a* that extends on a horizontal line beside the brake pedal 15.

Figure 3:
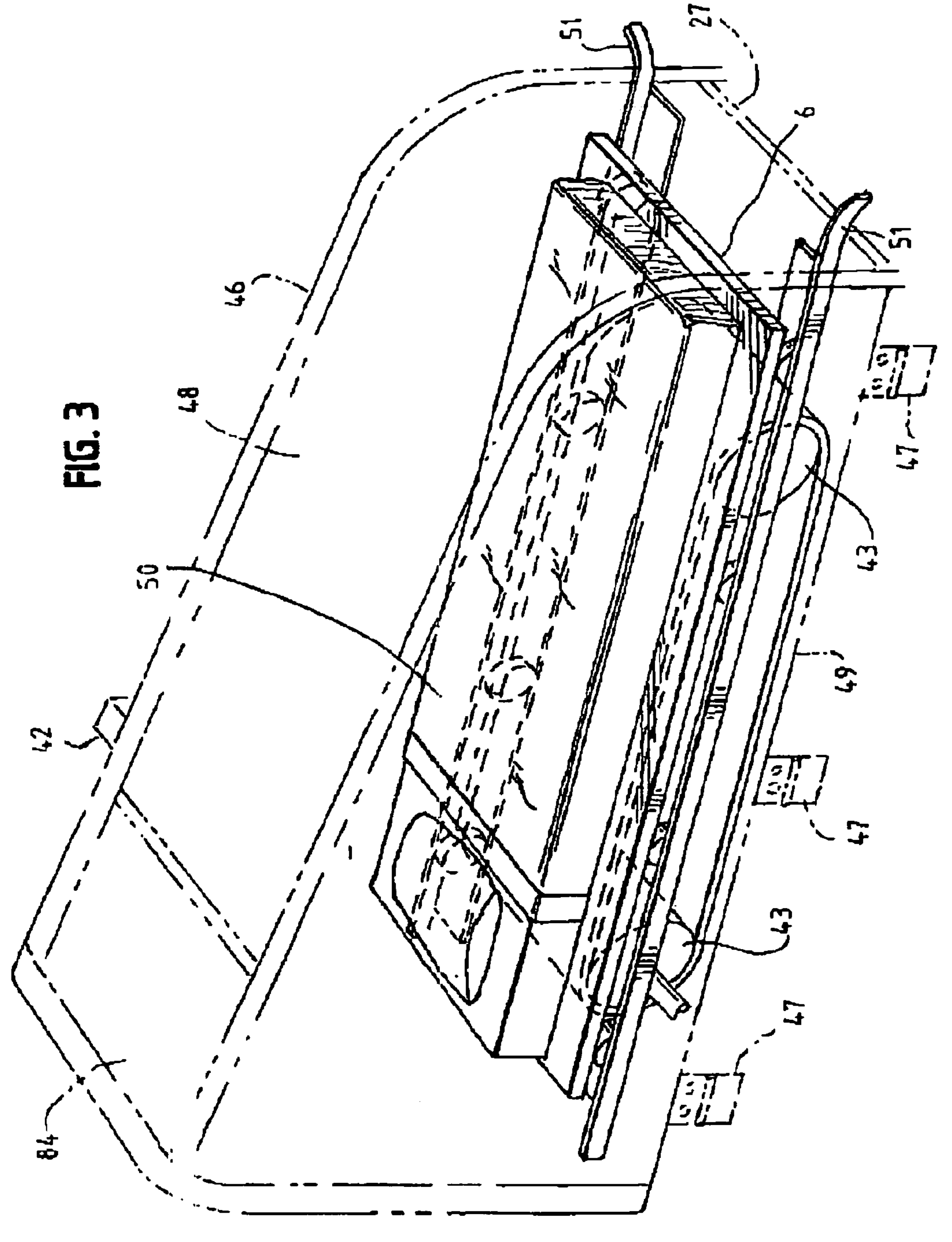

FIG. 3 sets forth is a transparent bed compartment 27 front section which extends horizontally beyond the front section of transparent bed compartment 27. Patient bed 6 is provided with rollers 43 which are attached to the patient's bed and are inserted into tracks 51, and thereby providing a unit that allows bed 6 to be rotated in and out off the transparent bed compartment 27. The transparent bed compartment having a left side 46 and a right side 49 consists of a top side 48. Metal hinges 47 on the right side are provided with metal fasteners that join the transparent bed compartment 27 to the right side of the transport vehicle, and a metal closure 42 is provided for closing the transparent bed compartment on the left side of the transport vehicle. The transparent bed compartment 27 which is provided with air section 84 as shown in all drawings is attached to the front elevation of the transport vehicle hood section. Aluminum steel groove bars having metal fasteners and plastic materials are preferably used for building the hood section.

FIG. 4 sets forth is a retractable bed device 6 that consists of foam material and is supported on a horizontal 51 which have rollers 43 as shown in cylinder tracks in FIGS. 3 and 4. Drive shafts 72 is propelled by electric motors 33 and 40, and thereby causing bed 6 to rotate on a flat plane in and out of transparent bed compartment 27 which is located at the top elevation of the hood section of the transport vehicle.

Figure 5:
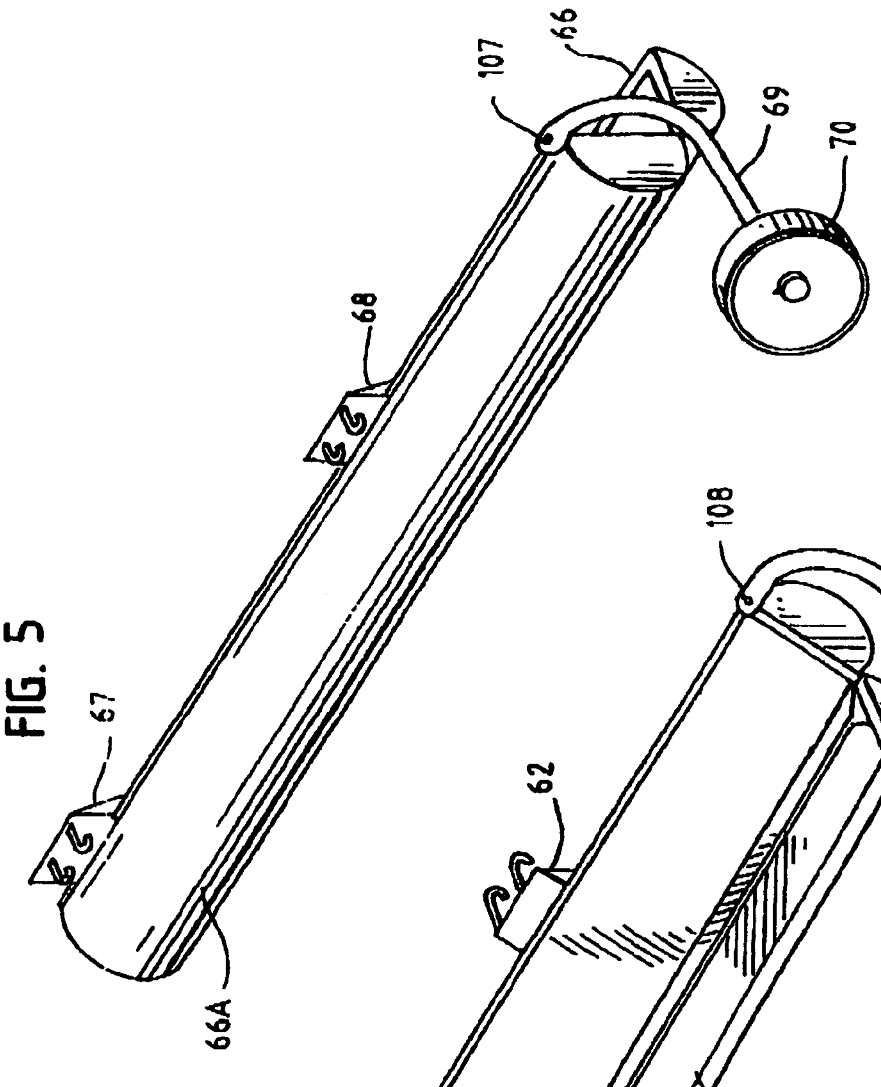
FIG. 5 is a perspective of a bed device that is adapted to be motor driven by a drive shaft or other power mechanism on horizontal cylinder tracks attached on the inside of the front end transparent bed compartment.
Figure 6:
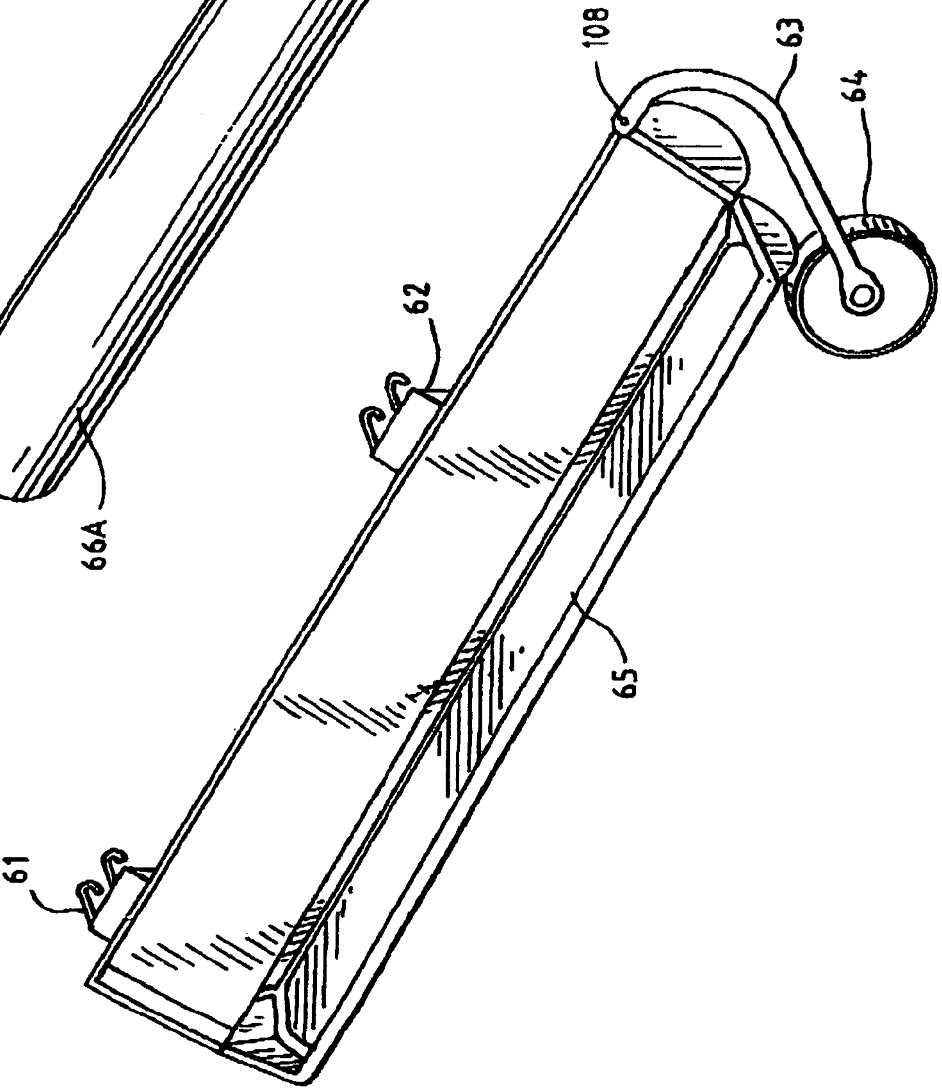
FIG. 6 is a perspective view of running boards that are adapted for attachment to the left and right sides of the transport vehicle and thereby providing platforms for caregivers to stand while providing emergency care.

FIG. 5 sets forth is a transport vehicle having detachable running boards 65 and 68 which are adapted for caregivers standing areas during emergency transports of patients. The running boards 65 and 68 consist of front end axle bars 63 and 69 which may be attached to front ends sections 107 and 108 respectively; they pivot on angles of several degrees for attaching to metal wheels 70*a* and 70*b* with tubeless tires 64 and 70 with metal fasteners in order to provide support for the extended ends of running boards 65 and 68. The running boards are fitted with metal rings and brackets and the like. Preferably, metal brackets 67 and 68 on the left side and 61 and 62 on the right side for attaching and retaining the running boards to the transport vehicle's left and right side frame sections 31 and 31*a* respectively according to present invention. Support bars and bracket devices are preferably used as fasteners to the body and frame areas by way of welding or the use of nuts and bolt devices as connecters for running boards 66 and 65. Once again, it should be clearly understood that in the preferred fabrication of the present invention, the left side not shown and the right side including first and second power sources compartment doors 8 and 29 are substantially identical to the right side of vehicle 12. Materials that are preferably used in forming the body and frame parts include aluminum steel, plastics and the like and an assortment of metal and plastic fasteners. Building processes that include welding and insulating body parts are advisable as methods for forming transport vehicle 12. A brake system that is capable of manipulating the rear wheels is preferred as means to maneuver the transport vehicle in less adapted environments. Transport vehicle 12 which is provided with lifting devices, is preferably constructed in accordance with the present invention, and it is generally referenced by numeral 12. The present invention provides for alternative methods in its design for the hood panel which is attached to the right side of the transport vehicle as shown in FIG. 3 which will require less extension of bed 6 beyond the exterior front section of the transport vehicle. Alternative methods further include back-up measures whereby bed 6 is fitted with devices that provide for manually maneuvering it in absent of automatic driving devices. Further, the present invention provides for motion detectors, sound and beeper devices.

The invention claimed is:

1. A transport vehicle with lifting devices comprising:

an instrument projecting from a main part of the transport vehicle with lifting devices is provided for maneuvering a patient into a folding chair that is placed beside the patient, and then maneuvering the patient in an upright position to lift into a bed that is on the inside of a passenger compartment of the transport vehicle; and a multipurpose chair that can be adjusted to lay flat or be placed into an upright position, and thereby providing a means for caregivers to lift and place the patient onto a bed inside of a transparent passenger compartment of the transport vehicle for transport to another treatment location.

2. A transport vehicle with lifting devices according to claim 1 further comprising:

a first and second power source for transferring electrical current for all dependent components within the vehicle in a manner that makes it safe and quiet for operating on the inside of hospitals and nursing homes; and metal horizontal open face rails that are adapted to contain rollers that are attached to the bed; and an intravenous stand on a front topside of the transport vehicle for emergency treatment during the transfer of the patient to various treatment locations.

3. A transport vehicle with lifting devices according to claim 1 comprising:

two running boards that can be attached to brackets on both sides of the vehicle with metal clamps being provided for standing as caregivers provide emergency medical treatment to patients during transport to different treatment locations; and one or more clamps that are designed to be attached to the running boards of the vehicle are inserted into vertical parts of the brackets, and thereby providing means for the running boards to be detached from the vehicle when they are not needed.

* * * * *